United States Patent
Witter et al.

(10) Patent No.: US 11,209,535 B2
(45) Date of Patent: Dec. 28, 2021

(54) ENHANCED VERTICAL OBJECT DETECTION FOR A VEHICLE RADAR SYSTEM

(71) Applicant: VEONEER SWEDEN AB, Vargarda (SE)

(72) Inventors: Mario Witter, Frankfurt (DE); Mireille Gregoire, Stuttgart (DE); Jonathan Moss, Haimhausen (DE)

(73) Assignee: VEONEER SWEDEN AB, Vargarda (SE)

(*) Notice: Subject to any disclaimer, the term of this patent is extended or adjusted under 35 U.S.C. 154(b) by 173 days.

(21) Appl. No.: 16/618,633

(22) PCT Filed: Jun. 5, 2018

(86) PCT No.: PCT/EP2018/064752
§ 371 (c)(1),
(2) Date: Dec. 2, 2019

(87) PCT Pub. No.: WO2018/224491
PCT Pub. Date: Dec. 13, 2018

(65) Prior Publication Data
US 2020/0191936 A1    Jun. 18, 2020

(30) Foreign Application Priority Data
Jun. 9, 2017  (EP) .................................. 17175314

(51) Int. Cl.
*G01S 13/48*  (2006.01)
*G01S 7/282*  (2006.01)
(Continued)

(52) U.S. Cl.
CPC .............. *G01S 13/48* (2013.01); *G01S 7/282* (2013.01); *G01S 7/2955* (2013.01);
(Continued)

(58) Field of Classification Search
CPC ........ G01S 13/343; G01S 13/42; G01S 13/87; G01S 13/878; G01S 13/931; G01S 7/003;
(Continued)

(56) References Cited

U.S. PATENT DOCUMENTS 8,390,507 B2   3/2013   Wintermantel
8,436,763 B2   5/2013   Wintermantel
(Continued)

FOREIGN PATENT DOCUMENTS

DE   10 2009 032 115 A1   1/2010
WO   WO 2016/055455 A1   4/2016

OTHER PUBLICATIONS

"Instantaneous Lateral Velocity Estimation of Vehicle using Doppler Radar", Dominik Kellner (Year: 2013).*
(Continued)

*Primary Examiner* — Timothy X Pham
(74) *Attorney, Agent, or Firm* — Dickinson Wright PLLC

(57) ABSTRACT

A vehicle radar sensor unit (2) arranged to acquire a plurality of radar detections, and including an antenna arrangement (3), a transmitter unit (4), a receiver unit (5) and a processing unit (6). The antenna arrangement (3) has at least two transmitter antennas (7, 8) and at least two receiver antennas (9, 10, 11, 12), where two transmitter antennas (7, 8) have a vertical spacing (h) between their respective phase centers (17, 18) that exceeds half the free-space wavelength of the transmitted signal. The processing unit (5) is arranged to determine a first radial velocity of each radar detection by tracking the change of radial distance (r) to each radar detection for a plurality of radar cycles; determine a second radial velocity that best matches the first radial velocity; track a plurality of measured heights (z) as a function of radial distance (r); and to choose a measured height ($z_{GT}$)
(Continued)

among the tracked measured heights (z) that has a minimal change from radar cycle to radar cycle.

8 Claims, 4 Drawing Sheets

(51) Int. Cl.
*G01S 7/295* (2006.01)
*G01S 13/931* (2020.01)
*G01S 13/46* (2006.01)

(52) U.S. Cl.
CPC ....... *G01S 13/931* (2013.01); *G01S 2013/468* (2013.01); *G01S 2013/93271* (2020.01)

(58) Field of Classification Search
CPC ...... G01S 7/03; G01S 7/352; G01S 2007/356; G01S 7/356; H01L 27/156; H01L 2933/0016; H01L 2933/0033; H01L 2933/005; H01L 2933/0058; H01L 2933/0066; H01L 33/007; H01L 33/0093; H01L 33/0095; H01L 33/20; H01L 33/22; H01L 33/24; H01L 33/382; H01L 33/405; H01L 33/44; H01L 33/54; H01L 33/56; H01L 33/60; H01L 33/62
See application file for complete search history.

(56) References Cited

U.S. PATENT DOCUMENTS

| | | |
|---|---|---|
| 8,593,333 B2 | 11/2013 | Wintermantel et al. |
| 8,665,137 B2 | 3/2014 | Wintermantel |
| 10,175,348 B2 | 1/2019 | Clark et al. |
| 2006/0044177 A1* | 3/2006 | Wittenberg ........... G01S 13/931 342/25 A |
| 2009/0015462 A1* | 1/2009 | Nakanishi .............. G08G 1/167 342/107 |
| 2011/0074620 A1 | 3/2011 | Wintermantel |
| 2011/0074621 A1 | 3/2011 | Wintermantel |
| 2011/0080313 A1 | 4/2011 | Wintermantel |
| 2011/0080314 A1 | 4/2011 | Wintermantel |
| 2016/0033632 A1 | 2/2016 | Searcy et al. |
| 2016/0103214 A1 | 4/2016 | Clark et al. |
| 2017/0293028 A1 | 10/2017 | Trummer |

OTHER PUBLICATIONS

"Tracking of Extended Objects with High Resolution Doppler Radar", Dominik Kellner (Year: 2015).*
International Search Report and Written Opinion of PCT/EP2018/064752 dated Jul. 2, 2018.

* cited by examiner

ENHANCED VERTICAL OBJECT DETECTION FOR A VEHICLE RADAR SYSTEM

CROSS-REFERENCE TO RELATED APPLICATIONS

This application is a 35 U.S.C. § 371 national phase of PCT International Application No. PCT/EP2018/064752, filed Jun. 5, 2018, which claims the benefit of priority under 35 U.S.C. § 119 to European Patent Application No. 17175314.8, filed Jun. 9, 2017, the contents of which are incorporated herein by reference in their entirety.

FIELD OF THE INVENTION

The present disclosure relates to a vehicle radar sensor unit including an antenna arrangement, a transmitter unit, a receiver unit and a processing unit. The antenna arrangement includes at least two transmitter antennas and at least two receiver antennas, where two transmitter antennas have a vertical spacing between their respective phase centers.

BACKGROUND

Today, vehicle radar systems are arranged to detect objects in order to implement functions such as speed control and collision prevention, as well as others. With increasing demands on reliability, it is desired to distinguish unimportant obstacles like bridges and gantries from important objects on the road which are used for implementing the functions.

The document WO 2016/055455 describes using at least two switchable transmitting antennas having different vertical positions of their corresponding phase centers, as well as a plurality of receiving antennas which are arranged in series. The phase centers of the transmitting antennas are vertically offset with respect to each other by a value that is less than or equal to half the free-space wavelength of the transmitted signal.

However, it is desired to have a larger vertical offset between the phase centers of the transmitting antennas, since this results in larger effective antenna aperture which brings an increased accuracy A larger vertical offset between the phase centers of the transmitting antennas will, however, result in a geometrical ambiguity.

There is thus a need for a vehicle radar systems that is arranged for detecting height, where the accuracy is increased compared with prior art.

SUMMARY AND INTRODUCTORY DESCRIPTIONS OF PREFERRED EMBODIMENTS OF THE INVENTION

The above-described features are desired achieved by a vehicle radar sensor unit including an antenna arrangement, a transmitter unit, a receiver unit and a processing unit. The antenna arrangement includes at least two transmitter antennas and at least two receiver antennas, where two transmitter antennas have a first horizontal spacing between their respective phase centers and a vertical spacing between their respective phase centers. The vehicle radar sensor unit is arranged to transmit time division multiplexed signals and to receive signals that have been reflected by one or more objects during a plurality of radar cycles, such that a plurality of radar detections is acquired. The vertical spacing exceeds half the free-space wavelength of the transmitted signal. The processing unit is arranged to:

Determine a first radial velocity of each radar detection by tracking the change of radial distance to each radar detection for each radar cycle during a plurality of radar cycles.

Determine a second radial velocity by choosing a measured radial velocity that best matches the first radial velocity.

Track a plurality of measured heights as a function of radial distance for each radar cycle during a plurality of radar cycles.

Choose a measured height among the tracked measured heights that has a minimal change from radar cycle to radar cycle.

This is also achieved by a method for a vehicle radar sensor unit using an antenna arrangement with at least two transmitter antennas and at least two receiver antennas. Two transmitter antennas have a first horizontal spacing between their respective phase centers and a vertical spacing between their respective phase centers. The vehicle radar sensor unit is used for transmitting time division multiplexed signals and for receiving signals that have been reflected by one or more objects during a plurality of radar cycles, such that a plurality of radar detections is acquired. The vertical spacing exceeds half the free-space wavelength of the transmitted signal.

A in accordance with an embodiment of the invention includes the steps of:

Determining a first radial velocity of each radar detection by tracking the change of radial distance to each radar detection for each radar cycle during a plurality of radar cycles.

Determining a second radial velocity by choosing a measured radial velocity that best matches the first radial velocity.

Tracking a plurality of measured heights as a function of radial distance for each radar cycle during a plurality of radar cycles.

Choosing a measured height among the tracked measured heights that has a minimal change from radar cycle to radar cycle.

According to some aspects, the processing unit is arranged to solve the equation $$\frac{dz_m}{dr} = \Delta m \cdot \frac{\lambda}{h}$$

for $\Delta m$, where $z_m$ is the measured height, $\lambda$ is the free-space wavelength of the transmitted signal, and where $$\Delta m = (m - m_{GT}),$$

where m denotes a geometrical ambiguity index and $m_{GT}$ denotes a ground truth geometrical ambiguity index that corresponds to a correct geometrical ambiguity index.

According to some aspects, the processing unit is arranged to determine the geometrical ambiguity index m according to the inequality:

$$-\frac{h}{\lambda} - 1 \leq m < \frac{h}{\lambda}.$$

Other examples are disclosed in the following description of preferred embodiments.

A number of advantages are obtained by implementation of the present disclosure. Mainly, a vehicle radar systems that is arranged for detecting height is obtained, where the accuracy is increased compared with prior art.

BRIEF DESCRIPTION OF THE DRAWINGS

The present disclosure will now be described more in detail with reference to the appended drawings, where.

DETAILED DESCRIPTION

Figure 1:
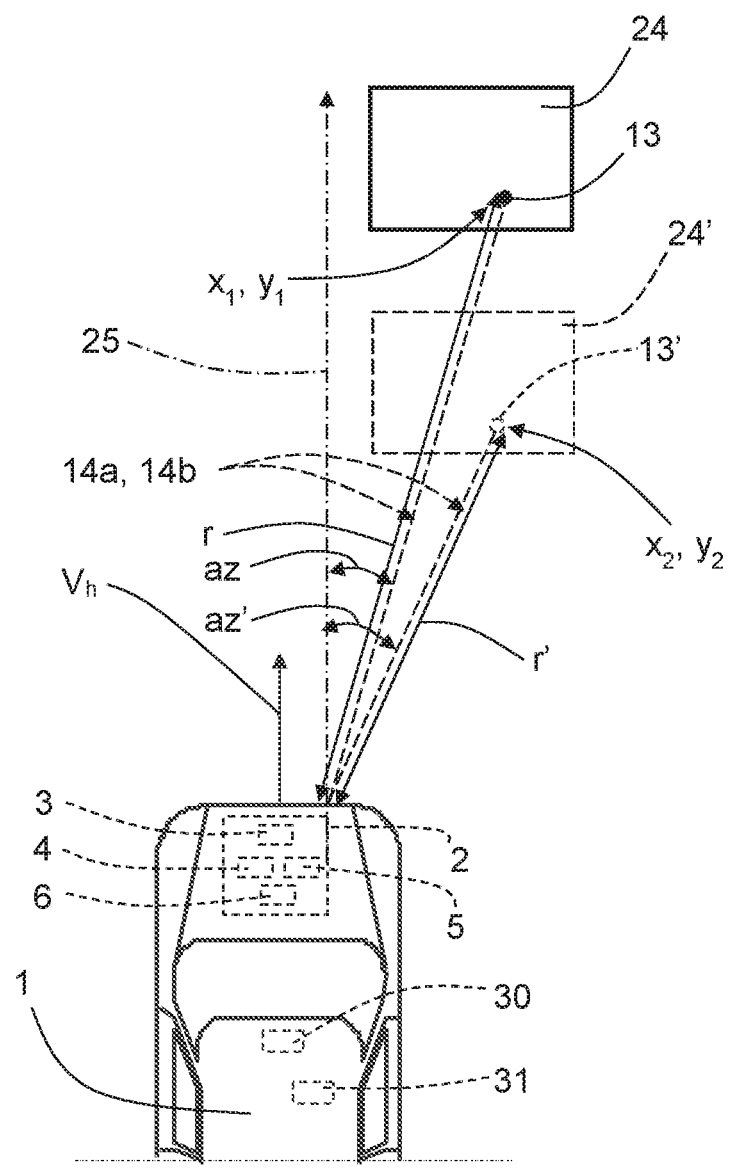
FIG. 1 shows a schematic top view of a vehicle with a radar sensor unit.

With reference to FIG. 1, showing a first example, a host vehicle 1 includes a vehicle radar sensor unit 2 that in turn includes an antenna arrangement 3, a transmitter unit 4, a receiver unit 5 and a processing unit 6. The host vehicle 1 is moving with a certain host vehicle velocity $v_h$ and there is a target object detection point 13 present in the vicinity of the vehicle's path, where a target object 24 is detected by the vehicle radar sensor unit 2. The vehicle radar sensor unit 2 is arranged for generating and transmitting sweep signals in the form of FMCW (Frequency Modulated Continuous Wave) chirp signals 14a, 14b of a previously known kind including a plurality of frequency ramps, and to receive reflected signals, where the transmitted chirp signals 14a, 14b have been reflected by the target object 24.

Figure 2:
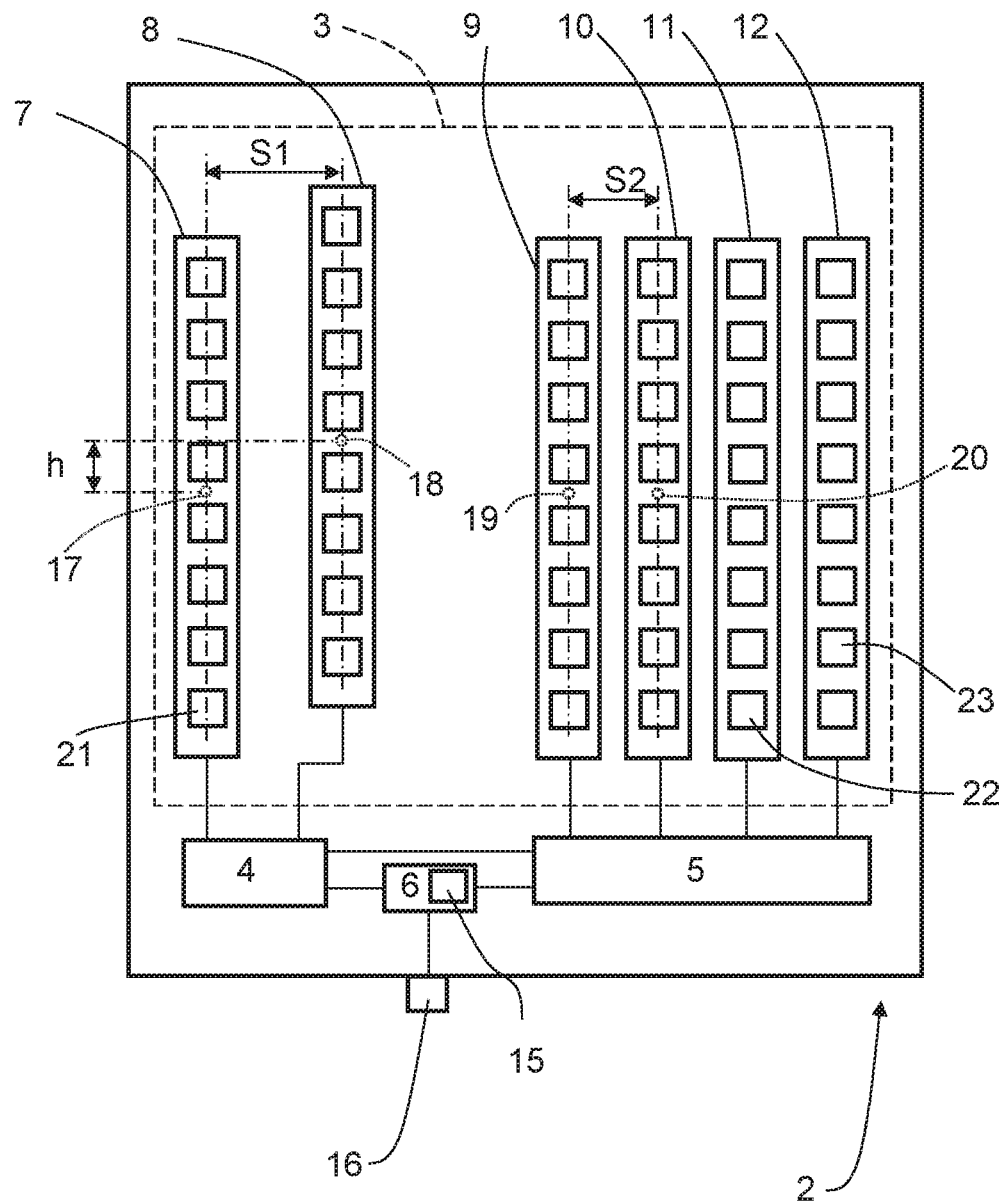
FIG. 2 shows a schematic representation of a radar sensor unit.

With reference to FIG. 2, a schematical view is presented for the radar sensor unit 2, disclosing that the antenna arrangement 3 includes a first transmitter antenna 7, a second transmitter antenna 8, a first receiver antenna 9, a second receiver antenna 10, a third receiver antenna 11 and a fourth receiver antenna 12. The transmitter unit 4 and the receiver unit 5 are connected to each other and to the processing unit 6, which includes a radar control unit 15 that in turn includes digital signal processing ability. The processing unit 6 is connected to a radar sensor unit port 16 arranged for receiving and sending signals to and from the radar sensor unit 2.

The transmitter antennas 7, 8 have a first horizontal spacing S1 between their respective phase centers 17, 18 and a vertical spacing h between their respective phase centers 17, 18 such that the second transmitter antenna 8 is positioned at a higher position than the first transmitter antenna 7. The receiver antennas have a second horizontal spacing S2 between their respective phase centers 19, 20 (only indicated for the first receiver antenna 9 and the second receiver antenna 10 for reasons of clarity) and no vertical spacing between their respective phase centers 19, 20.

The antennas 7, 8; 9, 10 11, 12 are schematically indicated as linear microstrip patch antenna arrays, but other antenna configurations are of course possible, such as for example dipole antennas. Only a few patches 21, 22, 23 are indicated for reasons of clarity). One or more antenna is according to some aspects constituted by one or more array antennas, or, alternatively, by a single antenna element.

Figure 3:
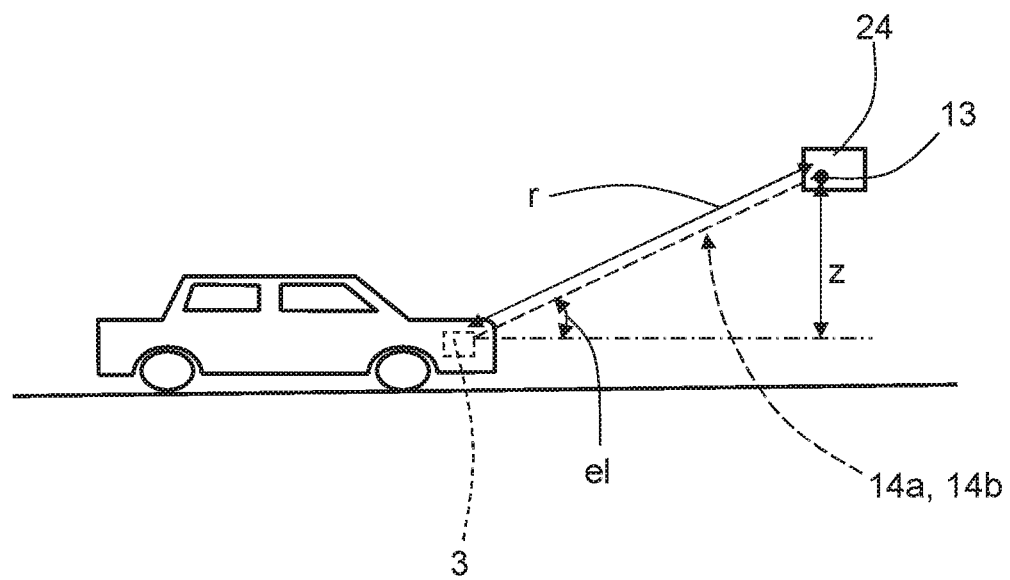
FIG. 3 shows a schematic lateral view of the vehicle.

With reference to FIG. 3, showing a side view of the vehicle 1, the target object 24 is positioned at a certain height z, where the value of the height z that corresponds to the actual height is denoted as $z_{GT}$, where GT stands for Ground Truth. The vertical spacing h admits detections in elevation with certain elevation angles el.

With renewed reference to FIG. 1, the target object detection point 13 has a first position $x_1$, $y_1$ at a first time instant and a corresponding following target object detection point 13' has a second position $x_2$, $y_2$ at a following second time instant due to the vehicle's movement. Correspondingly, a first range r is followed by a second range r', and a first azimuth angle az is followed by a second azimuth angle az', where the azimuth angles az, az' are measured against a reference line 25 that extends in the vehicle's forward running direction. In this way, a target object 24 is followed by two or more successive detections, in other words a detection point is tracked and followed over multiple frames, using a tracker.

A tracker, which also can be constituted by a point tracker, is generally constituted by a tracking algorithm that is arranged to track multiple features, e.g. corners, closest point, left-most etc., on an object. Such a tracking algorithm has a certain model for expected measurements and for motion behavior, and includes temporal filtering; according to some aspects by using a classical (extended) Kalman-filter. It has different states, e.g. position, velocity and acceleration, for each feature point and is arranged to calculate these states using measurements. Generally, a feature point tracker can contain multiple tracks, where each track corresponds to an instant of the model. In this way, the positions $x_1$, $y_1$; $x_2$, $y_2$ are determined for multiple frames.

Figure 4:
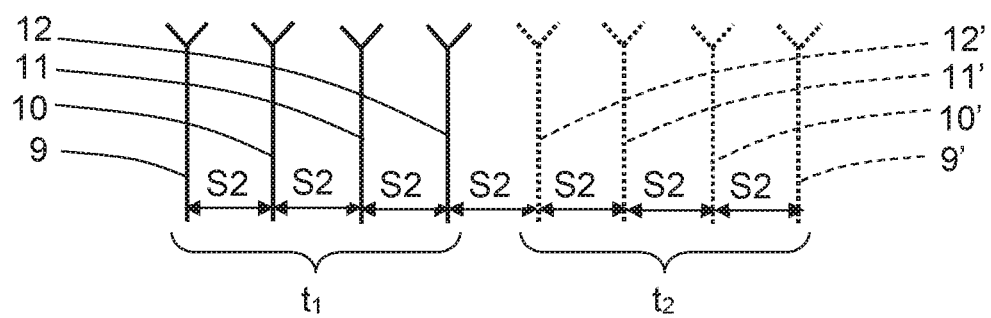
FIG. 4 shows a schematic representation of an antenna arrangement.
Figure 4:
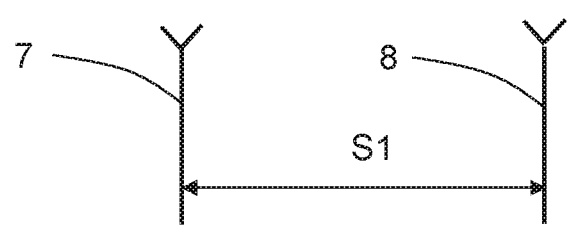

With reference to FIG. 4, showing a schematical view of the antenna arrangement 3, the first transmitter antenna 7 is activated at first times $t_{1(n)}$ (n=1 . . . N), where N is the number of frequency ramps in a radar cycle of the first chirp signal 14a, such that the receiver antennas 9, 10, 11, 12 are used for receiving reflected signals at a first position where they are indicated with solid lines.

The second transmitter antenna arrangement 8 is activated at second times $t_{2(n)}$ (n=1 . . . N), where N is the number of frequency ramps in a radar cycle of the second chirp signal 14b, such that the receiver antennas 9', 10b', 11c', 12d' are used for receiving reflected signals at a second position where they are indicated with dotted lines. In this way, a synthetic aperture that is twice as great as the real aperture, as well as eight receiving channels, are obtained. The transmitter antennas 7, 8 are activated repeatedly in an interleaved manner as will be described more in detail below. According to some aspects, the second horizontal spacing S2 equals a certain distance d and the first horizontal spacing S1 equals three times the certain distance, 3d.

Figure 5:
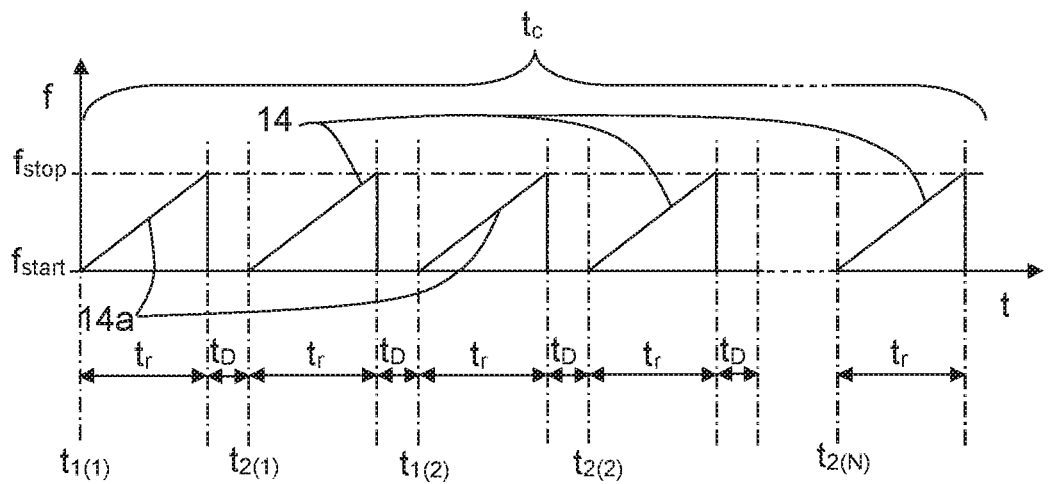
FIG. 5 shows a schematic representation of transmitted chirp signals.

As shown in FIG. 5, the first chirp signal 14a and the second chirp signal 14b are shown in the same graph with frequency on the Y-axis and time on the X-axis. The frequency varies from a first frequency $f_{start}$ to a second frequency $f_{stop}$ over the course of each ramp, where the magnitude of the first frequency $f_{start}$ falls below the magnitude of the second frequency $f_{stop}$. The first chirp signal 14a includes repeating cycles of a first plurality of frequency ramps and the second chirp signal 14b includes repeating cycles of a second plurality of frequency ramps where each cycle, constituting a radar cycle, has a duration of a cycle time $t_c$. According to some aspect, the chirp signals 14a, 14b have the same number of ramps for each cycle.

Generally, in this context, a radar cycle can also be regarded as one observation phase during which the vehicle radar sensor unit 2 is arranged to acquire data, process the data on several signal processing levels and to send out available results.

Each ramp lasts a certain ramp time $t_r$, the ramp time $t_r$ according to some aspects being the same for the first chirp signal 14a and the second chirp signal 14b. Between two consecutive ramps of the first chirp signal 14a as well as for the second chirp signal 14b there is a ramp time $t_r$ and a delay time $t_D$. The chirp signals 14a, 14b are timed such that between two consecutive ramps of the first chirp signal 14a, there is a ramp of the second chirp signal 14b, and vice versa such that the chirp signals 14a, 14b are interleaved with each other, the delay time $t_D$ occurring between two consecutive ramps of one chirp signal and the other chirp signal.

As well-known in the art, the received reflected signals are mixed with the transmitted chirp signals 14a, 14b in the receiver unit 5 such that an IF (Intermediate Frequency) signal is obtained and then filtered. The frequency of the filtered IF signal relates to target distance and is converted to a digital IF signal that is fed into the radar control unit 15 that is adapted for radar signal processing by use of well-known FFT (Fast Fourier Transform) processing. A range FFT function, first FFT, is arranged to convert the filtered digital IF signal to a range domain, and a Doppler FFT function, second FFT, is arranged to combine the results from successive chirp signal ramps, or other suitable Doppler radar cycles, into the Doppler domain, resulting in Range-Doppler matrices.

Since there is already information about Doppler, retrieved after the second FFT, this can be used to eliminate the phase shift of the received signals incurred by object movement. However, the phase shift is ambiguous because the time between two consecutive ramps of the two transmitter antennas 7, 8 is half the time of the sampling rate the Doppler signal, inducing a velocity ambiguity. An actual velocity v is related to a measured velocity $v_m$ as:

$$v=v_m+kA+\text{noise}, \quad (0)$$

where $k \in \mathbb{Z}$ is an integer and A is the velocity ambiguity. The value of k that corresponds to the actual velocity v is denoted as $k_{GT}$, where GT stands for Ground Truth.

When determining the velocity ambiguity, it is well-known that the maximum possible change in velocity from one radar cycle to another is much smaller than the velocity ambiguity. Once it is determined which ambiguity that is correct, it can be determined which is the actual velocity represented by a measurement by taking the nearest possible value to the known velocity.

When creating a track for an object, the actual velocity is unknown at the beginning. The radial relative velocity is the derivative of the range with respect to the time. In the duration time $t_c$ for a radar cycle, the range of an object with a radial relative velocity v changes by $v*t_c$. By observing the range over several radar cycles, the best matching velocities can be determined.

According to the present disclosure, the transmitter antenna vertical displacement distance h, constituting a vertical spacing h, exceeds a distance of a half wavelength at the center working frequency for the vehicle radar sensor unit 2. The relatively large spacing provides a larger antenna aperture, which in turn leads to higher accuracy. This will, however, lead to ambiguities that will have to be resolved; a Doppler ambiguity, velocity ambiguity, that induces a phase difference between the transmitter antennas 7, 8 and a geometrical ambiguity for the elevation or height value due to elevation phase. Resolving these ambiguities will be explained in the following.

The tracker has provided an estimate of the velocity as discussed previously, and this estimate is used to determine which one that is the correct velocity ambiguity. There are now either one or two possible elevation values that need to be resolved. For realistic heights, there is only one elevation value for detected ranges r exceeding about 40 meters. For objects that are detected far away, the ambiguities are already resolved. When objects that were detected far away are so near that there are two possible values for the elevation, it is already known which one is the correct one. When an object appears at near range, without an available estimate of the height, an alternative approach is necessary.

It should be noted that there is one or two possible elevation values for vertical spacing in the present example; for a larger vertical spacing, there could be more possible values. Furthermore, the vertical spacing in itself is important, but which transmitter antenna 7, 8 that is the higher one does not matter.

In accordance with the present disclosure, the height z of the object detection point 13, 13' is tracked for several radar cycles such that the height z is obtained as a function of distance to the object detection point 13, 13', i.e. as a function of range r. The height z is thus tracked as a function of range r and is assumed to be constant. The equation $$\frac{dz_m}{dr} = \Delta m \cdot \frac{\lambda}{h}, \quad (1)$$

where $z_m$ is the measured height, $\lambda$ is the free-space wavelength of the transmitted signal, and h denotes the transmitter antenna vertical displacement distance as mentioned previously, is then acquired.

Equation (1) will be solved for $\Delta m$, where $$\Delta m=(m-m_{GT}) \quad (2).$$

Here, m denotes the geometrical ambiguity index and $m_{GT}$ denotes ground truth geometrical ambiguity index, i.e. the correct geometrical ambiguity index.

Since the height z of the object detection point 13, 13' is assumed to be constant, equation (1) will equal zero or be close to zero. Using this knowledge, $m_{GT}$ can be obtained by tracking all possible heights with the assumption that the height does not change and then determine the correct height z.

How the above is achieved will now be described more in detail.

Here, $$x=r\sqrt{1-(\sin az)^2-(\sin el)^2}$$

$$y=r \sin az$$

$$y=r \sin el$$

where:

(x; y; z) are the Cartesian coordinates of the object detection point 13, 13';

r is the range;

az is the azimuth angle; and el is the elevation angle.

The phase difference between 2 channels depends on the azimuth of the incident wave, the horizontal spacing between the antennas, the elevation and the vertical spacing between the antennas and the velocity. Now the Range-Doppler map, the output of the 2D-FFT on range and Doppler for each channel, is considered for all 8 channels. Since the two transmitter antennas 7, 8 are separated both horizontally and vertically, the signal processing involves more steps than a single FFT for the azimuth.

For a given Direction of Arrival in azimuth and elevation, a model for the relative phase between two channels $i=(Rx_{ri}; Tx_{ti})$ and $j=(Rx_{rj}; Tx_{tj})$ is written as:

$$\Delta\Phi_{i,j} = \frac{2\pi}{\lambda}(\Delta d_{i,j}u_{az} + \Delta h_{i,j}u_{el} + 2v\Delta t_{i,j}), \quad (3)$$

where:
- $\times\phi_{i,j}$ is the relative phase between two channels;
- $\Delta d_{i,j}$ is the horizontal distance; $\Delta d_{i,j}=d(r_j-r_i)+3d(t_j-t_i)$
- $\Delta h_{i,j}$ is the vertical distance; $\Delta h_{i,j}=h(t_j-t_i)$;
- $u_{az}=\sin az$;
- $u_{el}=\sin el$;
- v is the relative radial velocity (Doppler); and
- $\Delta t_{i,j}$ is the time difference of different transmitter antennas.

In the above, the term 3d above, and also as used below, is the value of the horizontal spacing between the transmitter antennas 7, 8 in the present example and can according to some aspects have another value.

The Doppler induces a phase difference between the transmitter antennas 7, 8 that needs to be corrected if the 8 channels are to be combined. The Doppler has been acquired from previous processing steps, however only modulo the ambiguity. The two possible values for Doppler phase correction are:

$$\Delta\Phi_{d1} = \frac{2\pi}{\lambda}(2v_m\Delta t) \quad (4)$$

$$\Delta\Phi_{d2} = \Phi_{d1} + \pi, \quad (5)$$

where $v_m$ is the measured velocity.

Corresponding phasors for the Doppler phase correction are written as:

$$e^{i\Delta\Phi_{d1}} = e^{i\frac{2\pi}{\lambda}(2v_m\Delta t)}. \quad (6)$$

$$e^{i\Delta\Phi_{d2}} = e^{i\Delta\Phi_{d1}+\pi}. \quad (7)$$

A phasor for the azimuth correction using d1=3d is written as:

$$e^{i\Delta\Phi_{az}} = e^{i\frac{2\pi}{\lambda}(3d\,u_{az})}. \quad (8)$$

A relative phasor between the transmitter antennas 7, 8 is given by:

$$e^{i\Delta\Phi_{Tx3,Tx4}} = e^{i\frac{2\pi}{\lambda}(3d\,u_{az}+h\,u_{el}+2v\Delta t)}. \quad (9)$$

Here, the terms Tx3 and Tx4 relate to the transmitter antennas 7, 8, respectively.

Combining the above results in two possibilities for the elevation phasor brings:

$$e^{i\Phi_{el,1}} = e^{i\Delta\Phi_{Tx3,Tx4}}e^{-i\Delta\Phi_{az}}e^{-i\Delta\Phi_{d1}} \quad (10)$$

$$e^{i\Phi_{el,2}} = e^{i\Delta\Phi_{Tx3,Tx4}}e^{-i\Delta\Phi_{az}}e^{-i\Delta\Phi_{d2}} \quad (11)$$

with $$e^{i\Phi_{el,1}} = e^{i\Phi_{el,2}}e^{i\pi} \quad (12)$$

An elevation phasor is now acquired between the transmitter antennas 7, 8. One of the Doppler hypotheses has been chosen according to velocity determined by the tracker:

$$e^{i\Phi_{el,k}} = e^{i\frac{2\pi}{\lambda}hu_{el}}, \quad (13)$$

where $\phi_{el,k}$ is the measured phase between two channels.

In order to be able deal with the ambiguities in a less complicated manner, the measured phase $\phi_{el,k}$ is chosen such that $0 \leq \phi_{el,k} < 2\pi$, thus only having 2 branches instead of 3, where the phase is defined modulo $2\pi$ according to:

$$\Phi_{el,k} + 2m\pi = \frac{2\pi}{\lambda}hu_{el,k,m}, \quad (14)$$

where $m \in \mathbb{Z}$ is an integer. This brings:

$$u_{el,k,m} = \frac{\Phi_{el,k} + 2m\pi}{\frac{2\pi}{\lambda}h}, \quad (15)$$

which finally leads to:

$$u_{el,k,m} = \frac{\lambda}{h}\left(\frac{\Phi_{el,k}}{2\pi} + m\right). \quad (16)$$

Investigating different values for m yields:

$-1 \leq u_{el,k,m} \leq 1$ since it is sine of an angle $-1 \leq \frac{\lambda}{h}\left(\frac{\Phi_{el,k}}{2\pi} + m\right) \leq 1$ $-\frac{h}{\lambda} \leq \frac{\Phi_{el,k}}{2\pi} + m \leq \frac{h}{\lambda}$ $-\frac{\Phi_{el,k}}{2\pi} - \frac{h}{\lambda} \leq m \leq -\frac{\Phi_{el,k}}{2\pi} + \frac{h}{\lambda}$ It is known that $0 \leq \Phi_{el,k} < 2\pi$ $0 \leq \frac{\Phi_{el,k}}{2\pi} < 1$ $-1 < -\frac{\Phi_{el,k}}{2\pi} \leq 0,$ which results in $$-\frac{h}{\lambda} - 1 \leq m < \frac{h}{\lambda}. \quad (17)$$

It is to be noted that the number of branches depends on the vertical spacing h.

An example with numbers will now be provided. It is to be noted that this is only an example with the intention of conferring understanding of the present disclosure.

According to some aspects, each radar cycle includes 128 ramps in total, 64 ramps for each transmitter antenna 7, 8, where 1024 samples are taken per ramp.

According to some aspects, for the elevation mode, the second horizontal spacing S2 equals a certain distance $d=0.5\lambda$ and the first horizontal spacing S1 equals three times the certain distance, $3d=2\lambda$, and $h=0.79\lambda$ which approximately equals 3.1 mm at 77 GHz.

This leads to that a main lobe and first side lobe are unambiguous, corresponding to an elevation angle of $\pm 15°$. 128 FMCW ramps are used for a radar cycle, toggling between the transmitter antennas 7, 8 with 64 ramps each. After Range FFT (Fast Fourier Transform) and Doppler FFT, 8 channels are acquired with each 320 Range Bins and 64 Doppler Bins.

According to the numerical example, $$\frac{h}{\lambda} = 0.79,$$

and then equation (17) states $-1.79 \leq m \leq 0.79$. Since m is an integer, $m \in \{-1, 0\}$.

The tracker has provided an estimate of the velocity as discussed previously, and this estimate is used to determine which is the correct velocity ambiguity, and thus $k = k_{GT}$.

Equation (16) is then re-written as:

$$u_{el,k_{GT},m} = \frac{\lambda}{h}\left(\frac{\Phi_{el,k_{GT}}}{2\pi} + m\right), \quad (18)$$

which leads to:

$$u_{el,k_{GT},m} = u_{el,k_{GT},n} + (m-n)\frac{\lambda}{h}. \quad (19)$$

The actual height $z_{GT}$ is linked to the range r and the actual elevation angle $el_{GT}$ as:

$$z_{GT} = r u_{el,GT} \quad (20).$$

Since it is known that the height z mainly is constant, the following assumption can be made:

$$\frac{dz_{GT}}{dr} = 0 = u_{el,GT} + r\frac{du_{el,GT}}{dr}. \quad (21)$$

For one value of m, an hypothesis of m, the following is written:

$$\frac{dz_{k_{GT},m}}{dr} = u_{el,k_{GT},m} + r\frac{du_{el,k_{GT},m}}{dr}$$

$$= \left(u_{el,GT} + (m - m_{GT})\frac{\lambda}{h}\right) +$$

$$r\frac{d}{dr}\left(u_{el,GT} + (m - m_{GT})\frac{\lambda}{h}\right)$$

$$= \left(u_{el,GT} + r\frac{du_{el,GT}}{dr}\right) +$$

-continued $$(m - m_{GT})\frac{\lambda}{h} + 0$$

$$= (m - m_{GT})\frac{\lambda}{h}$$

which results in:

$$\frac{dz_{k_{GT},m}}{dr} = (m - m_{GT})\frac{\lambda}{h}. \quad (22)$$

Equation (22) provides a way to find the correct ambiguity $m_{GT}$. Since in this case $m \in \{-1, 0\}$, generally depending on the vertical spacing h, the possible values for $$\frac{dz_{k_{GT},m}}{dr} \text{ are } \left\{-\frac{\lambda}{h}, 0, \frac{\lambda}{h}\right\}.$$

Evaluating $$\frac{dz_{k_{GT},m}}{dr}$$

over time assuming a relative movement, by comparing the estimated value with the theoretical values, the correct value for m can be determined. In the table below, possible values of $$\frac{dz_{k_{GT},m}}{dr}$$

for different values of m are presented:

|  | 2 ambiguities, $m_{GT} = 0$ | 1 ambiguity | 2 ambiguities, $m_{GT} = -1$ |
|---|---|---|---|
| m = 0 | 0 | 0<br>Both possible | $\frac{\lambda}{h}$ |
| m = 1 | $-\frac{\lambda}{h}$ | values of m are considered together. | 0 |

Since it is $dz_m/dr$ that is of interest, the variation of z should not be tracked as a function of time, but as a function of range. Using the time as base variable means that the velocity has to be corrected, where special care is needed when the relative velocity is 0. Special care is needed around the jump of hypothesis. There are two possibilities:

The value with m=0 is the correct one, and the value with m=−1 is driven by $$-\frac{\lambda}{h}\Delta\tau.$$

The value with m=−1 is the correct one, and the value with m=0 is driven by $$\frac{\lambda}{h}\Delta\tau.$$

For each of those 2 possibilities, two Kalman Filter are needed; one with a constant height model and one driven by $$\pm\frac{\lambda}{h}\Delta\tau.$$

At each radar cycle, for each possibility, the two measured values are associated with the nearest tracked value. A comparison of the innovation over the time gives the correct hypothesis. If there is a cycle with only one elevation value, one of the hypothesis is invalidated.

The present disclosure thus relates to tracking all possible heights z, and with the assumption that the height does not change, pick the correct one $z_{GT}$.

Figure 6:
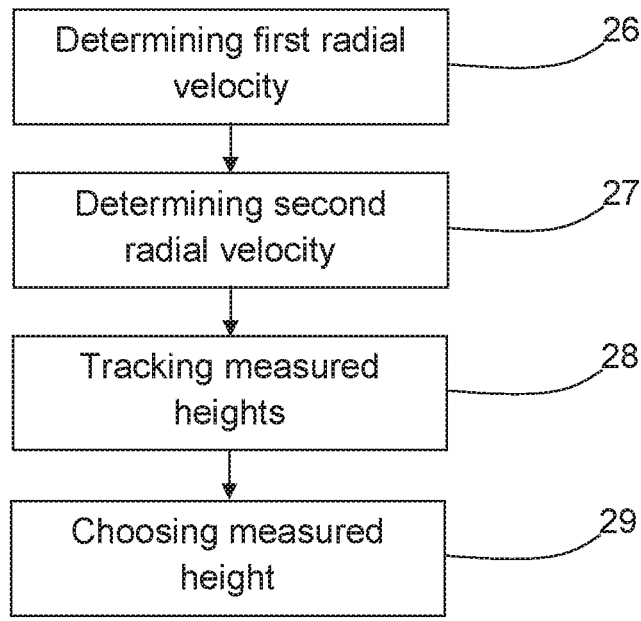
FIG. 6 shows a flowchart for a method according to the present disclosure.

With reference to FIG. 6, the present disclosure also relates to a method for a vehicle radar sensor unit 2 using an antenna arrangement 3, a with at least two transmitter antennas 7, 8 and at least two receiver antennas 9, 10, 11, 12. Two transmitter antennas 7, 8 have a first horizontal spacing S1 between their respective phase centers 17, 18 and a vertical spacing h between their respective phase centers 17, 18. The vehicle radar sensor unit 2 is used for transmitting time division multiplexed signals 14a, 14b and for receiving signals that have been reflected by one or more objects during a plurality of radar cycles, such that a plurality of radar detections is acquired. The vertical spacing h exceeds half the free-space wavelength of the transmitted signal. The method includes the following steps:

Step 26: Determining a first radial velocity of each radar detection by tracking the change of radial distance r to each radar detection for each radar cycle during a plurality of radar cycles.

Step 27: Determining a second radial velocity by choosing a measured radial velocity that best matches the first radial velocity.

Step 28: Tracking a plurality of measured heights z as a function of radial distance r for each radar cycle during a plurality of radar cycles.

Step 29: Choosing a measured height $z_{GT}$ among the tracked measured heights z that has a minimal change from radar cycle to radar cycle.

The present disclosure is not limited to the examples above, but may vary freely within the scope of the appended claims. For example, the microwave parts of the radar sensor arrangement 3 are assumed to be of a previously known design, and according to some aspects the radar sensor arrangement 3 includes more parts than shown, and is for example connected to a warning and/or information device in the vehicle 1 in a previously known manner.

The calculations and determining procedures are performed by the processing unit 6, where the processing unit 6 should be regarded as a processing unit arrangement that is in the form of one unit or several units that either co-operate or handle different tasks more or less independently. In the case of several units, these may be placed adjacent to each other, or in a distributed manner.

All details given in the example are of course only given as an illustration of the present disclosure, and should not be regarded as limiting in any way.

In this context, a frame suitably relates to a group of a number of radar signals, or a group of radar signals.

There may be more or less than the four receiver antennas 9, 10, 11, 12 described, there should however be at least two receiver antennas. If there are more than two receiver antennas, according to some aspects, different pairs of adjacent receiver antennas have different horizontal spacings between their respective phase centers.

There may be more than the two transmitter antennas 7, 8 described, there should however be at least two transmitter antennas 7, 8, where at least two transmitter antennas 7, 8 have a vertical spacing h between their respective phase centers 17, 18. If there are more than two transmitter antennas, according to some aspects, different pairs of adjacent transmitter antennas have different horizontal spacings between their respective phase centers.

The chirp signals 14a, 14b can include signals of any suitable frequency ramp configuration, for example sawtooth signals and down-ramps where $f_{start} < f_{stop}$. Generally, the vehicle radar sensor unit (2) is arranged to transmit any sort of time division multiplexed signals 14a, 14b, such as for example FMCW signals.

The ambiguous part of the negative hypothesis is only needed for over-runnable objects at very close range. A possibility could be to only track the positive/unique elevation value. Care should be taken that there is no false classification for these objects.

Another possibility would be to reject all detections outside of the unambiguous zone as being either over-runnable or under-runnable. Due to the high level of noise, this could reduce too much the effective tracking zone.

As indicated in FIG. 1, the vehicle 1 includes a safety control unit 30 and safety system 31, for example an emergency braking system and/or an alarm signal device. The safety control unit 30 is arranged to control the safety system 31 in dependence of input from the radar sensor unit 2. Such input may be input via the processing unit 6.

Generally, the present disclosure relates to a vehicle radar sensor unit 2 including an antenna arrangement 3, a transmitter unit 4, a receiver unit 5 and a processing unit 6, where the antenna arrangement 3 includes at least two transmitter antennas 7, 8 and at least two receiver antennas 9, 10, 11, 12, where two transmitter antennas 7, 8 have a first horizontal spacing S1 between their respective phase centers 17, 18 and a vertical spacing h between their respective phase centers 17, 18, where the vehicle radar sensor unit 2 is arranged to transmit time division multiplexed signals 14a, 14b and to receive signals that have been reflected by one or more objects during a plurality of radar cycles, such that a plurality of radar detections is acquired. The vertical spacing h exceeds half the free-space wavelength of the transmitted signal, where the processing unit 5 is arranged to:

determine a first radial velocity of each radar detection by tracking the change of radial distance r to each radar detection for each radar cycle during a plurality of radar cycles;

determine a second radial velocity by choosing a measured radial velocity that best matches the first radial velocity;

track a plurality of measured heights z as a function of radial distance r for each radar cycle during a plurality of radar cycles; and to choose a measured height $z_{GT}$ among the tracked measured heights z that has a minimal change from radar cycle to radar cycle.

According to some aspects, the processing unit 5 is arranged to solve the equation $$\frac{dz_m}{dr} = \Delta m \cdot \frac{\lambda}{h}$$

for $\Delta m$, where $z_m$ is the measured height, $\lambda$ is the free-space wavelength of the transmitted signal 14a, 14b, and where $$\Delta m = m - m_{GT},$$

where m denotes a geometrical ambiguity index and $m_{GT}$ denotes a ground truth geometrical ambiguity index that corresponds to a correct geometrical ambiguity index.

According to some aspects, the processing unit 5 is arranged to determine $$u_{el,k,m} = \frac{\lambda}{h}\left(\frac{\Phi_{el,k}}{2\pi} + m\right),$$

where $u_{el,k,m}$ denotes sin el in view of k an m, where el is an elevation angle for a certain target object detection point 13, 13' and $k \in \mathbb{Z}$ is an integer, where furthermore $\phi_{el,k}$ is the measured phase between two channels.

According to some aspects, the processing unit 5 is arranged to determine the geometrical ambiguity index m according to the inequality:

$$-\frac{h}{\lambda} - 1 \le m < \frac{h}{\lambda}.$$

Generally, the present disclosure also relates to a method for a vehicle radar sensor unit 2 using an antenna arrangement 3 with at least two transmitter antennas 7, 8 and at least two receiver antennas 9, 10, 11, 12, where two transmitter antennas 7, 8 have a first horizontal spacing S1 between their respective phase centers 17, 18 and a vertical spacing h between their respective phase centers 17, 18, where the vehicle radar sensor unit 2 is used for transmitting time division multiplexed signals 14a, 14b and for receiving signals that have been reflected by one or more objects during a plurality of radar cycles, such that a plurality of radar detections is acquired. The vertical spacing h exceeds half the free-space wavelength of the transmitted signal, where the method includes the steps of:

Step 26 determining a first radial velocity of each radar detection by tracking the change of radial distance r to each radar detection for each radar cycle during a plurality of radar cycles;

Step 27 determining a second radial velocity by choosing a measured radial velocity that best matches the first radial velocity;

Step 28 tracking a plurality of measured heights z as a function of radial distance r for each radar cycle during a plurality of radar cycles; and Step 29 choosing a measured height $z_{GT}$ among the tracked measured heights z that has a minimal change from radar cycle to radar cycle.

According to some aspects, the method includes solving the equation:

$$\frac{dz_m}{dr} = \Delta m \cdot \frac{\lambda}{h}$$

for $\Delta m$, where $z_m$ is the measured height, $\lambda$ is the free-space wavelength of the transmitted signal 14a, 14b, and where $$\Delta m = m - m_{GT},$$

where m denotes a geometrical ambiguity index and $m_{GT}$ denotes a ground truth geometrical ambiguity index that corresponds to a correct geometrical ambiguity index.

According to some aspects, the method includes determining:

$$u_{el,k,m} = \frac{\lambda}{h}\left(\frac{\Phi_{el,k}}{2\pi} + m\right),$$

where $u_{el,k,m}$ denotes sin el in view of k an m, where el is an elevation angle for a certain target object detection point 13, 13' and $k \in \mathbb{Z}$ is an integer, where furthermore $\phi_{el,k}$ is the measured phase between two channels.

According to some aspects, the method includes determining the geometrical ambiguity index m according to the inequality:

$$-\frac{h}{\lambda} - 1 \le m < \frac{h}{\lambda}.$$

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar sensor unit comprising, an antenna arrangement, a transmitter unit, a receiver unit and a processing unit, where the antenna arrangement comprises at least two transmitter antennas and at least two receiver antennas, where the at least two transmitter antennas have a first horizontal spacing between respective phase centers and a vertical spacing between the respective phase centers, where the vehicle radar sensor unit is arranged to transmit time division multiplexed signals and to receive signals that have been reflected by one or more objects during a plurality of radar cycles, such that a plurality of radar detections is acquired, the vertical spacing exceeds half the free-space wavelength of the transmitted signal, where the processing unit is arranged to:

determine a first radial velocity of each of the radar detections by tracking the change of a radial distance to each of the radar detections for each of the radar cycles during the plurality of the radar cycles;

determine a second radial velocity by choosing a measured radial velocity that best matches the first radial velocity;

track a plurality of measured heights as a function of the radial distance for each of the radar cycles during the plurality of radar cycles; and to choose one of the measured heights among the tracked measured heights that has a minimal change from one of the radar cycles to another of the radar cycles.

2. The vehicle radar sensor unit according to claim 1 further comprising, the processing unit is arranged to solve the equation:

$$\frac{dz_m}{dr} = \Delta m \cdot \frac{\lambda}{h}$$

for $\Delta m$, where $z_m$ is the measured height, $\lambda$ is a free-space wavelength of the transmitted signal, and where $$\Delta m = (m - m_{GT}),$$

where m denotes a geometrical ambiguity index and $m_{GT}$ denotes a ground truth geometrical ambiguity index that corresponds to a correct geometrical ambiguity index.

3. The vehicle radar sensor unit according to claim 2 further comprising, the processing unit is arranged to determine:

$$u_{el,k,m} = \frac{\lambda}{h}\left(\frac{\Phi_{el,k}}{2\pi} + m\right),$$

where $u_{el,k,m}$ denotes sin el in view of k and m, where el is an elevation angle for a certain target object detection point and $k \in \mathbb{Z}$ is an integer, where $\phi_{el,k}$ is the measured phase between two channels.

4. The vehicle radar sensor unit according to claim 2 further comprising the processing unit is arranged to determine the geometrical ambiguity index m according to the inequality:

$$-\frac{h}{\lambda} - 1 \leq m < \frac{h}{\lambda}.$$

5. A method for a vehicle radar sensor unit using an antenna arrangement with at least two transmitter antennas and at least two receiver antennas, where the transmitter antennas have a first horizontal spacing between respective phase centers, and a vertical spacing between respective phase centers, where the vehicle radar sensor unit is used for transmitting time division multiplexed signals and for receiving signals that have been reflected by one or more objects during a plurality of radar cycles, such that a plurality of radar detections is acquired, the vertical spacing exceeds half the free-space wavelength of the transmitted signal, where the method includes:
    determining a first radial velocity of each of the radar detections by tracking a change of radial distance to each of the radar detections for each of the radar cycles during a plurality of the radar cycles;
    determining a second radial velocity by choosing a measured radial velocity that best matches the first radial velocity;
    tracking a plurality of measured heights as a function of the radial distance for each of the radar cycles during a plurality of the radar cycles; and
    choosing a measured height among the tracked measured heights that has a minimal change from radar cycle to radar cycle.

6. The method according to claim 5 wherein the method further comprises, solving the equation:

$$\frac{dz_m}{dr} = \Delta m \cdot \frac{\lambda}{h}$$

for $\Delta m$, where $z_m$ is the measured height, $\lambda$ is the free-space wavelength of the transmitted signal, and where:

$$\Delta m = (m - m_{GT}),$$

where m denotes a geometrical ambiguity index and $m_{GT}$ denotes a ground truth geometrical ambiguity index that corresponds to a correct geometrical ambiguity index.

7. The method according to claim 6 wherein the method further comprises, determining:

$$u_{el,k,m} = \frac{\lambda}{h}\left(\frac{\Phi_{el,k}}{2\pi} + m\right),$$

where $u_{el,k,m}$ denotes sin el in view of k and m, where el is an elevation angle for a certain target object detection point and $k \in \mathbb{Z}$ is an integer, where $\phi_{el,k}$ is the measured phase between two channels.

8. The method according to claim 6 wherein the method further comprises, determining the geometrical ambiguity index m according to the inequality:

$$-\frac{h}{\lambda} - 1 \leq m < \frac{h}{\lambda}.$$

* * * * *